US010579961B2

(12) United States Patent
Bruns et al.

(10) Patent No.: US 10,579,961 B2
(45) Date of Patent: Mar. 3, 2020

(54) METHOD AND SYSTEM OF IDENTIFYING ENVIRONMENT FEATURES FOR USE IN ANALYZING ASSET OPERATION

(71) Applicant: Uptake Technologies, Inc., Chicago, IL (US)

(72) Inventors: Tyler Eilert Bruns, Highland Park, IL (US); Brian Robert Keating, Chicago, IL (US); Adam McElhinney, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 235 days.

(21) Appl. No.: 15/416,996

(22) Filed: Jan. 26, 2017

(65) Prior Publication Data
US 2018/0211204 A1 Jul. 26, 2018

(51) Int. Cl.
*G06Q 10/08* (2012.01)
(52) U.S. Cl.
CPC .................. *G06Q 10/087* (2013.01)
(58) Field of Classification Search
None
See application file for complete search history.

(56) References Cited

U.S. PATENT DOCUMENTS

| | | | |
|---|---|---|---|
| 5,566,092 A | 10/1996 | Wang et al. | |
| 5,633,800 A | 5/1997 | Bankert et al. | |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |
| 6,622,264 B1 | 9/2003 | Bliley et al. | |

(Continued)

FOREIGN PATENT DOCUMENTS

| | | |
|---|---|---|
| WO | 2011117570 | 9/2011 |
| WO | 2013034420 | 3/2013 |

(Continued)

OTHER PUBLICATIONS

Biswas, "Redundancy-based Approaches in Wireless Multihop Network Design", PhD Dissertation Submitted to Graduate Faculty of North Carolina State University (2014), 154 pages.

(Continued)

*Primary Examiner* — Fateh M Obaid
(74) *Attorney, Agent, or Firm* — Lee Sullivan Shea & Smith LLP

(57) ABSTRACT

Based on an analysis of asset attribute data associated with a plurality of assets, a platform may detect a locality that is a possible instance of a given type of environment, such as a mine or construction site. In response, the platform may obtain image data associated with the detected locality and input that image data into a model that outputs likelihood data indicating a likelihood that any portion of the detected locality comprises a given feature of the given type of environment (e.g., a boundary, navigation route, hazard, etc.), where this model is defined based on training data. Based on the likelihood data, the platform may then generate output data indicating a location of any portion of the detected locality that is likely to comprise the given feature. In turn, the platform may use the output data to simulate asset operation in the detected locality.

20 Claims, 9 Drawing Sheets

(56) References Cited

U.S. PATENT DOCUMENTS

| | | | |
|---|---|---|---|
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B2 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |
| 6,823,253 B2 | 11/2004 | Brunell | |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,233,886 B2 | 6/2007 | Wegerich et al. | |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,725,293 B2 | 5/2010 | Bonissone et al. | |
| 7,739,096 B2 | 6/2010 | Wegerich et al. | |
| 7,756,678 B2 | 7/2010 | Bonissone et al. | |
| 7,822,578 B2 | 10/2010 | Kasztenny et al. | |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,050,800 B2 | 11/2011 | Miller et al. | |
| 8,145,578 B2 | 3/2012 | Pershing et al. | |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,275,577 B2 | 9/2012 | Herzog | |
| 8,285,402 B2 | 10/2012 | Lueckenbach et al. | |
| 8,311,774 B2 | 11/2012 | Hines | |
| 8,352,216 B2 | 1/2013 | Subbu et al. | |
| 8,532,795 B2 | 9/2013 | Adavi et al. | |
| 8,533,018 B2 | 9/2013 | Miwa et al. | |
| 8,560,494 B1 | 10/2013 | Downing et al. | |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 2002/0091972 A1* | 7/2002 | Harris | G06F 11/008 714/47.2 |
| 2002/0152056 A1 | 10/2002 | Herzog et al. | |
| 2003/0055666 A1* | 3/2003 | Roddy | B61L 27/0094 705/305 |
| 2003/0126258 A1 | 7/2003 | Conkright et al. | |
| 2004/0181712 A1 | 9/2004 | Taniguchi et al. | |
| 2004/0243636 A1 | 12/2004 | Hasiewicz et al. | |
| 2005/0119905 A1 | 6/2005 | Wong et al. | |
| 2005/0222747 A1 | 10/2005 | Vhora et al. | |
| 2006/0190419 A1* | 8/2006 | Bunn | G06N 99/005 706/2 |
| 2007/0263628 A1 | 11/2007 | Axelsson et al. | |
| 2008/0059080 A1 | 3/2008 | Greiner et al. | |
| 2008/0059120 A1 | 3/2008 | Xiao et al. | |
| 2009/0062971 A1 | 3/2009 | Rottig et al. | |
| 2011/0153214 A1 | 6/2011 | Sprock et al. | |
| 2011/0276440 A1* | 11/2011 | Collins | G06Q 10/06 705/28 |
| 2012/0271612 A1 | 10/2012 | Barsoum et al. | |
| 2012/0310597 A1 | 12/2012 | Uchiyama et al. | |
| 2013/0010610 A1 | 1/2013 | Karthikeyan et al. | |
| 2013/0024416 A1 | 1/2013 | Herzog | |
| 2013/0283773 A1 | 10/2013 | Hague | |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |
| 2014/0060030 A1 | 3/2014 | Ma et al. | |
| 2014/0088820 A1 | 3/2014 | Jericho et al. | |
| 2014/0089035 A1 | 3/2014 | Jericho et al. | |
| 2014/0105481 A1 | 4/2014 | Hasselbusch et al. | |
| 2014/0121868 A1 | 5/2014 | Zhang et al. | |
| 2014/0169398 A1 | 6/2014 | Arndt et al. | |
| 2014/0170617 A1 | 6/2014 | Johnson et al. | |
| 2014/0184643 A1 | 7/2014 | Friend | |
| 2014/0222355 A1 | 8/2014 | Cheim et al. | |
| 2014/0258201 A1 | 9/2014 | Finlow-Bates | |
| 2014/0316841 A1 | 10/2014 | Kilby et al. | |
| 2014/0330600 A1 | 11/2014 | Candas et al. | |
| 2014/0330749 A1 | 11/2014 | Candas et al. | |
| 2014/0351642 A1 | 11/2014 | Bates et al. | |
| 2014/0357295 A1 | 12/2014 | Skomra et al. | |
| 2014/0358601 A1 | 12/2014 | Smiley et al. | |
| 2015/0016712 A1* | 1/2015 | Rhoads | G06K 9/00208 382/154 |
| 2015/0033341 A1 | 1/2015 | Schmidtler et al. | |
| 2015/0046870 A1 | 2/2015 | Goldenberg et al. | |
| 2015/0077276 A1 | 3/2015 | Mitchell et al. | |
| 2015/0262060 A1 | 9/2015 | Husain et al. | |
| 2015/0379774 A1* | 12/2015 | Trainor | G06T 19/006 345/633 |
| 2016/0173963 A1 | 6/2016 | Filson et al. | |
| 2016/0378585 A1* | 12/2016 | McElhinney | G06F 11/0751 714/37 |
| 2017/0165019 A1* | 6/2017 | Penny | A61B 34/70 |

FOREIGN PATENT DOCUMENTS

| | | |
|---|---|---|
| WO | 2014145977 | 9/2014 |
| WO | 2014205497 | 12/2014 |
| WO | 2015148302 A1 | 10/2015 |

OTHER PUBLICATIONS

Isermann, "Model-based Fault Detection and Diagnosis—Status and Applications", Institute of Automatic Control, Darmstadt University of Technology (2004), 12 pages.

Narasimhan et al, "Combining Model-Based and Feature-Driven Diagnosis Approaches—A Case Study on Electromechanical Actuators", 21st International Workshop on Principles of Diagnosis (2010), 8 pages.

(56) References Cited

OTHER PUBLICATIONS

Prentzas et al, Categorizing Approaches Combining Rule-Based and Case-Based Reasoning, 34 pages.
Infor M3 Enterprise Management System, Infor.com (2014), 4 pages.
Infor Equipment, Infor.com (2012), 4 pages.
Infor Introduces Next-Generation Solution for Equipment Dealers and Service Providers, Infor.com (Feb. 20, 2014), 5 pages.
Infor Equipment for Rental, Infor.com (2013), 8 pages.
Waltermire et al, Applying the Continuous Monitoring Technical Reference Model to the Asset, Configuration, and Vulnerability Management Domains (DRAFT), NIST (Jan. 2012), 29 pages.
Lecia Geosystems AG. "Leics Jigsa Jmineops: Dispatch, Reporting & Product Optimization." Version 1.0, 2012, 6 pages.
Matejicek et al. "Spatio-Temporal Modelling of Dust Transport over Surface Mining Areas and Neighbouring Residential Zones." Sensors 2008, vol. 8, published Jun. 6, 2008, pp. 3830-3847.
Biswas, "Redundancy-based Approaches in Wireless Multihop Network Design", PhD Dissertation Submitted to Graduate Faculty of North Carolina State University (2014).
Isermann, "Model-based Fault Detection and Diagnosis—Status and Applications", Institute of Automatic Control, Darmstadt University of Technology (2004).
Narasimhan et al, "Combining Model-Based and Feature-Driven Diagnosis Approaches—A Case Study on Electromechanical Actuators", 21st International Workshop on Principles of Diagnosis (2010).
Prentzas et al, Categorizing Approaches Combining Rule-Based and Case-Based Reasoning.
Infor M3 Enterprise Management System, Infor.com (2014).
Infor Equipment, Infor.com (2012).
Infor Introduces Next-Generation Solution for Equipment Dealers and Service Providers, Infor.com (Feb. 20, 2014).
Infor Equipment for Rental, Infor.com (2013).
Waltermire et al, Applying the Continuous Monitoring Technical Reference Model to the Asset, Configuration, and Vulnerability Management Domains (DRAFT), NIST (Jan. 2012).
International Searching Authority, International Search Report and Written Opinion dated May 30, 2018, issued in connection with International Application No. PCT/US2018/015345, filed on Jan. 26, 2018, 10 pages.

* cited by examiner

METHOD AND SYSTEM OF IDENTIFYING ENVIRONMENT FEATURES FOR USE IN ANALYZING ASSET OPERATION

BACKGROUND

Today, machines (also referred to herein as "assets") are ubiquitous in many industries. From locomotives that transfer cargo across countries to farming equipment that harvest crops, assets play an important role in everyday life.

Because of the increasing role that assets play, it is also becoming increasingly desirable to monitor and analyze assets in operation. To facilitate this, some have developed mechanisms to monitor asset attributes and detect abnormal conditions at an asset. For instance, one approach for monitoring assets generally involves various sensors and/or actuators distributed throughout an asset that monitor the operating conditions of the asset and provide signals reflecting the asset's operation to an on-asset computer. As one representative example, if the asset is a locomotive, the sensors and/or actuators may monitor parameters such as temperatures, pressures, fluid levels, voltages, and/or speeds, among other examples. If the signals output by one or more of the sensors and/or actuators reach certain values, the on-asset computer may then generate an abnormal condition indicator, such as a "fault code," which is an indication that an abnormal condition has occurred within the asset. The on-asset computer may also be configured to monitor for, detect, and generate data indicating other events that may occur at the asset, such as asset shutdowns, restarts, etc.

The on-asset computer may also be configured to send data reflecting the attributes of the asset, including operating data such as signal data, abnormal-condition indicators, and/or asset event indicators, to a remote location for further analysis.

For instance, an organization that is interested in monitoring and analyzing assets in operation may deploy an asset data platform that is configured to receive and analyze various types of asset-related data. For example, the asset data platform may be configured to receive and analyze data indicating asset attributes, such as asset identifiers, asset operating data, asset configuration data, asset location data, etc. As another example, the data-analysis platform may be configured to receive and analyze asset maintenance data, such as data regarding inspections, servicing, and/or repairs. As yet another example, the data-analysis platform may be configured to receive and analyze external data that relates to asset operation, such as weather data, traffic data, or the like. The data-analysis platform may be configured to receive and analyze various other types of asset-related data as well.

Further, the asset data platform may receive this asset-related data from various different sources. As one example, the data-analysis platform may receive asset-related data from the assets themselves. As another example, the asset data platform may receive asset-related data from some other platform or system (e.g., an organization's existing platform) that previously received and/or generated asset-related data. As yet another example, the asset data platform may receive asset-related data from an external data source, such as an asset maintenance data repository, a traffic data provider, and/or a weather data provider for instance. The asset data platform may receive asset-related data from various other sources as well.

Overview

In many instances, a group of assets may be operating together in a particular environment (e.g., a particular locality in which a group of assets operate), examples of which may include a mining site, a construction site, a manufacturing plant, or a distribution center. Such an environment may have various features, which may either be static (e.g., relatively fixed) or dynamic (changing over time). In one example, the features of an environment may include a boundary which defines an outmost border of the environment. In another example, the features of an environment may include a navigation route in the environment over which assets may travel, such as a road or a haul route. In yet another example, the features of an environment may include a hazard such as a cliff, steep terrain, or river which assets should avoid when traveling in the environment. In still another example, the features of an environment may include the assets located within the environment (e.g., mining trucks in a mining site, construction equipment at a construction site, etc.), which could either be stationary or mobile. In a further example, the features of an environment may include structures such as buildings. Other types of environment features may exist as well.

In instances such as these where assets are operating together in a particular environment, it would be advantageous for an asset data platform to have accurate information regarding the existence and/or location of the particular environment and its features. For example, the asset data platform may use information regarding the existence and location of features in a particular environment to accurately simulate asset operation in the environment. The simulation may allow for determining how assets in the environment may be best deployed in the environment to enable increased efficiency in usage of assets and meet demand. This increased efficiency in usage could take the form of, reduced asset travel time within the environment, reduced asset congestion on navigation routes in the environment, and minimization of a number of assets being parked (e.g., inactive) in the environment, among other possibilities.

Disclosed herein are improved systems, devices, and methods for intelligently identifying features in an environment in which assets may operate. According to an embodiment, the disclosed methods may be carried out by an asset data platform that is configured to identify a given feature (e.g., a boundary, navigation route, hazard, etc.) in a given type of environment based on (a) image data (e.g., satellite, camera-based, and/or remotely-sensed image data) and (b) attribute data for assets in the field (e.g., asset identifiers, location data, signal data, fault data, asset configuration data, etc.). The process for identifying features of the environment may generally comprise two phases, referred to herein as a "training" phase and a "run-time" phase.

During a training phase, the asset data platform may define a model for identifying a given feature in a given type of environment in which assets operate based on image data (e.g., satellite data) associated with known instances of the given type of environment. For example, the asset data platform may obtain and/or otherwise be provided with image data for known instances of a given type of environment (e.g., mine sites) that currently exists or previously existed in a given locality (e.g., a city, state, country, continent, or some other defined locality). This image data may take various forms.

In one implementation, the image data for each known instance of an environment may comprise an array of pixels that are representative of the known instance of the environment, where such pixels vary in color, intensity, ordering, organization, structure, etc. to indicate the features of the environment (e.g., hills, cliffs, valleys, rivers and/or man-made structures such as roads, bridges, fences, buildings, storage racks in buildings, etc.). The array of pixels may also be associated with location data that indicates a location of the known instance of the environment.

In addition, the image data for each known instance of an environment may be "labeled" (e.g., annotated) with data indicating where features are known to exist in the known instance. As examples, the image data for a known instance of a mine site may be labeled with data indicating the portion of the image data that is representative of the mine site's boundary, data indicating any portion of the image data that is representative of a navigation route in the mine site, and/or data indicating any portion of the image data that is representative of a hazard in the mine site. In practice, the data "label" for a given feature in the environment may be associated with a set of pixels within the image data. The set of pixels may take the form of raster data or vector data that represents the given feature. Vector data can be converted to raster data and vice versa. In some cases, the set of pixels may be also associated with polylines which encircle the given feature. Further, the data labels for a given feature may take various forms, examples of which include a binary indicator of whether pixels are associated with the given feature (e.g., yes or no) and/or a relative indicator of whether pixels are associated with the given feature (e.g., a "score" from 0 to 100). Collectively, the image data and corresponding data labels may be referred to herein as "training data."

The "training data" may be created in various manners. According to an example, a system may first identify known instances of a given type of environment (e.g., based on user input), obtain and/or otherwise be provided with image data for the known instances of the given type of environment, and then present the image data to one or more users (e.g., via a display screen). In turn, the one or more users may analyze the image data, identify any features of interest within the image data (e.g., environment boundary, navigation routes, hazards, etc.), and input the user's identification of the features into the system (e.g., via a user input device such as a mouse, keyboard, touchscreen, or the like). Based on this input, the system may then define labels of data (e.g., by generating indicators or annotations corresponding to particular sets of pixels within the image data). This system that creates the training data may be separate from the asset data platform or may be implemented as part of the asset data platform.

The asset data platform may then define a model for identifying a given feature in a given type of environment based on this training data. For instance, the asset data platform may apply a machine learning technique to the training data, such as supervised learning, to define a model for identifying a given feature in a given type of environment. In practice, the machine learning technique may involve (a) selecting a given feature of a given type of environment for which to define a model, (b) accessing and/or otherwise being provided with training data associated with known instances of the given feature in the given type of environment (e.g., image data associated with known instances of the given type of environment that has been labeled with data indicating that a portion of the image data is representative of the given feature), (c) analyzing the training data associated with known instances of the given feature in the given type of environment to define a relationship between (1) the characteristics of pixels within the image data (e.g., the color, intensity, ordering, organization, structure, etc. of the pixels) and (2) the likelihood that such pixels are representative of the given feature, and (d) embodying the defined relationship into a model that is used to identify the given feature within the image data. The asset data platform may define the model in other manners as well, which may involve other machine learning, computer vision, and/or image processing techniques now known or later developed.

In an embodiment of a model for identifying a given feature, the input of the model may be image data for a given locality and the output of the model may be data indicating whether any portion of the image data is representative of the given feature. This output may take various forms. In one embodiment, the output of the model may comprise a set of likelihood values that each corresponds to a particular portion of the image data (e.g., a subset of pixels) and each indicates the likelihood that the corresponding portion of the image data is representative of the given feature. This set of likelihood values may readily be thought of as a two-dimensional matrix of likelihood values that corresponds to a two-dimensional matrix of image data, where each likelihood value in the likelihood-value matrix corresponds to the portion of the image data (e.g., the subset of pixels) located at the same position within the image-data matrix. Additional matrix dimensions may be used, for example, to capture additional information such as spatial information, e.g. elevation, and/or time as associated with the image data.

In another embodiment, the output of the model may comprise an image processed version of the image-data matrix. For example, the border of image-data cells with likelihoods that exceed a threshold may be used to extract the boundary of a feature. As another example, a skeleton of transportation routes comprised of the collection of connected nodes may be constructed from the image-data cells. The model for identifying a given feature of a given type of environment may take other forms as well.

It should be understood that a given type of environment may have multiple features of interest, in which case the asset data platform may define a model for each different feature of interest that the platform wishes to identify for a given type of environment. It should also be understood that the features of interest may differ for different types of environments, and thus in some implementations, the asset data platform may define different models for different types of environments. In other implementations, the asset data platform may define models for features that are common to multiple types of environments.

In some implementations, the asset data platform may define a model for identifying a given feature in a given type of environment based on other types of data as well. For example, in addition to the image data, the training data used to define a model for identifying a given feature in a given type of environment may also include asset attribute data for assets in a known instance of a given type of environment that may have a relationship with the given feature, examples of which may include asset identifiers, asset speed, asset weight, asset location etc. For instance, if a given asset attribute is identified as potentially being indicative of a given feature, the system that creates the training data may (a) access asset attribute data for assets located in a known instance of a given environment, (b) access data for the given asset attribute produced by such assets while operating in the known instance of the given environment, and (c) include the given asset attribute identified as potentially being indicative of the given feature in the training data for the given environment along with corresponding labels indicating whether each value of the given asset attribute produced by the assets in the known instance of the given environment is associated with the given feature (e.g., a binary or relative indicator). It is possible that other types of data may be used in the training phase as well.

During the run-time phase, the asset data platform may be configured to intelligently identify the existence (and/or location) of one or more features in a given type of environment based on image data, asset attribute data, and/or one or more models defined during the training phase. The asset data platform may carry out this run-time phase in various manners.

According to an embodiment, the asset data platform may begin this phase by monitoring asset attribute data for assets in the field to detect whether there is any grouping of assets in a locality that is a possible instance of the given type of environment. This asset attribute data may be received from the asset, another platform, or some other data source. Further, this asset attribute data may take a variety of forms, examples of which may include asset identifiers, asset location data, asset operating data (e.g., signal data, fault data, etc.), asset configuration data (e.g., brand, make, model, age, software version, etc.). It should also be understood that the platform may be configured to receive asset attribute data for a large number of assets (e.g., thousands or more) that may be located in various regions throughout the world.

The function of detecting a locality that may be a possible instance of the given type of environment may also take various forms. According to one example, this function may involve detecting a threshold number of a related type of asset (e.g., assets of the same type, brand, make, model, etc.) within a threshold distance of one another (e.g., within a half mile), which is indicative of a possible instance of a given type of environment (e.g., a mine site, construction site, manufacturing plant, distribution center, etc.). The asset data platform may detect a locality that is a possible instance of the given type of environment in other manners as well.

In response to detecting a locality that is a possible instance of a given type of environment, the platform may then obtain and/or otherwise be provided with image data (e.g., satellite, camera-based, and/or remotely-sensed image data) associated with the detected locality. For instance, the platform may use the asset attribute data to determine a general location of the detected locality and then obtain image data associated with that general location (e.g., by requesting that image data from an external data source). The platform may obtain image data associated with the detected locality in other manners as well.

After obtaining the image data, the platform may apply one or more models defined in the training phase to the obtained image data to determine a likelihood of whether any portion of the image data contains is representative of any feature(s) of interest. The platform may be configured to perform this function on the obtained image data either in "real-time" (e.g., around the time that the locality is detected and the image data is obtained) or at some later point in time when previously-obtained image data may be analyzed either singly or in a batch. Further, this function may take various forms.

In one implementation, the asset data platform may first select which model(s) to apply to the image data, which may vary depending on what type of environment is identified based on the asset attribute data. For example, the asset data platform may be able to determine based on the asset attribute data that a mine site appears to exist at the detected locality, in which case the asset data platform may choose to apply models that relate to the particular features of a mine site (where each model may either be unique to mine sites or may be common to other environment types). In another example, the asset data platform may only be able to determine based on the asset attribute data that an unspecified type of environment appears to exist at the detected locality, in which case the asset data platform may choose to apply models for various different types of environments. Other examples are possible as well.

After selecting the model(s), the asset data platform may then apply each selected model to the image data by inputting the image data into the model. In the event that the model was trained on certain asset attributes along with image data, the asset data platform may also be configured to access the relevant asset attribute data for assets located near the possible instance of the given environment and then input that asset attribute data into to the model as well. In turn, the model may output a likelihood that the detected locality includes the given feature.

Based on the output of the model, the asset data platform may then generate output data indicating whether any portion of the detected locality is likely to comprise a feature of interest. This output data may take various forms. In one example, the output data may take the form of location data (e.g., geographic coordinates such as latitudes and longitudes coordinates or Cartesian coordinates) for any portion of the detected locality likely to comprise a feature of interest, such as any subset of pixels having a likelihood value that exceeds a threshold value. In another example, the output data may include an identifier of the given feature (e.g., a boundary of an environment, a navigation route in the environment, a loading site, a dump site, etc.) and potentially also the likelihood value(s) corresponding to the identified portion(s) of the detected locality. In yet another example, the output data may take the form of a "heat map" depicting the spatial distribution of likelihood values of features of interest by varying color indicative of the feature of interest and/or likelihood value. The output data could take other forms as well.

The asset data platform may use this output data for various purposes. According to one embodiment, the asset data platform may use the output data to simulate asset operation at the detected locality. Various techniques may be employed to perform this simulation, one example of which is commonly referred to as discrete-event simulation (DES).

The use of the output data in the simulation of asset operation at the detected locality may take various forms. In one instance, the platform may use the output data to assist in defining the initial conditions of a simulation model, such as the location of each feature in the locality that is to remain static during the simulation and the initial location of each feature in the locality that is intended to change during the simulation.

In another instance, after defining the initial conditions of a simulation model, the platform may run the simulation model to predict movement of assets at the locality over some period of time, thereby resulting in new, simulated location of certain assets at the locality at some later point in time. In turn, the platform may then compare the simulated location of the asset at this later point in time to output data for the locality at that same point in time, which may then enable the platform to perform various other actions. For example, based on this comparison, the platform may validate and verify the simulation model. As another example, based on this comparison, the platform may identify differences between the predicted movement of assets and the actual movement of the assets, which may provide insight into the operation of the assets.

In yet another instance, the platform may run the simulation model to predict movement of certain assets at the detected locality in view of the identified environment features (e.g., the boundary, one or more routes, etc.) and calculate metrics such as travel time, congestion, fuel consumption, which may then be used to optimize asset operation in the detected locality (e.g., by routing assets in a manner to minimize one or more of these metrics).

In still another instance, the platform may use different sets of output data for a locality to define starting and ending times for a simulation and then simulate the operation of assets at the locality during the period between these starting and ending times, which may enable the platform to impute asset attribute data (e.g., asset location, asset speeds, etc.) for the assets during this period. This ability to impute asset attribute data may be particularly useful in situations where asset attribute data is missing (e.g., due to failed data transmissions or the like) and/or where assets are obstructed in certain image data (e.g. due to cloudy weather or the like).

In a further instance, if the platform identifies an environment feature at the detected locality a later time than the start of the simulation, the platform may then insert the feature into the simulation model at the appropriate simulation time.

The simulation of asset operation at the detected locality—and the use of the output data in that simulation—may take various other forms as well.

According to another embodiment, the asset data platform may use the output data to present a map of the detected locality and any feature(s) of interest located therein. For example, the map may be presented via a client station that is in communication with the asset data platform.

According to yet another embodiment, the asset data platform may use the output data for the detected locality to monitor for any changes to the detected locality. For example, after generating a first set of output data for the detected locality as described above, the asset data platform may be configured to access image data for the detected locality at a later point in time and then repeat the above process to generate a second set of output data, which the asset data platform may then compare with the first set of output data to determine whether there have been any changes to the features identified in the detected locality over time. For instance, based on a comparison between different sets of output data for a locality over time, the platform may be able to determine that a feature (e.g., a boundary, route, asset, etc.) has been modified, added, or removed at the locality. Additionally, based on a comparison between different sets of output data for a locality over time, the platform may be able to determine a relationship between features at the locality, such as a relationship between a static feature and a dynamic feature (e.g., that a mining truck is routed on a particular haul route) or between two dynamic features (e.g., that an excavator is loading a haul truck). In turn, the asset data platform may present a user with indication of the information determined based on this comparison, such as a notification of a change in features at the locality and/or an update to mapping of the detected locality.

As discussed above, the examples provided herein are related to identifying features in an environment based on image data and/or asset attribute data.

In one aspect, a computer implemented method is provided. Asset attribute data associated with a plurality of assets is received. Based on an analysis of the received asset attribute data, a locality is detected that is a possible instance of a given type of environment. In response to the detecting, image data associated with the detected locality is obtained. The obtained image data is input into a model that outputs likelihood data indicating a likelihood that any portion of the detected locality comprises a given feature of the given type of environment, wherein the model is defined based on training data that includes respective image data for each of a plurality of known instances of the given type of environment. Based on the likelihood data, output data is generated indicating a location of any portion of the detected locality that is likely to comprise the given feature. The output data is used to simulate asset operation in the detected locality.

In another aspect, a computing system is provided. The computing system comprises a network interface configured to facilitate communications over a communication network with one or more data sources, at least one processor, a non-transitory computer-readable medium; and program instructions stored on the non-transitory computer-readable medium that are executable by the at least one processor. The program instructions are executable by the at least one processor to cause the computing system to: receive, via the network interface, asset attribute data associated with a plurality of assets; based on an analysis of the received asset attribute data, detect a locality that is a possible instance of a given type of environment; in response to the detecting, obtain, via the network interface, image data associated with the detected locality; input the obtained image data into a model that outputs likelihood data indicating a likelihood that any portion of the detected locality comprises a given feature of the given type of environment, wherein the model is defined based on training data that includes respective image data for each of a plurality of known instances of the given type of environment; based on the likelihood data, generate output data indicating a location of any portion of the detected locality that is likely to comprise the given feature; and use the output data to simulate asset operation in the detected locality.

In yet another aspect, a non-transitory computer-readable medium is provided having instructions stored thereon that are executable to cause a computing system to: receive asset attribute data associated with a plurality of assets; based on an analysis of the received asset attribute data, detect a locality that is a possible instance of a given type of environment; in response to the detecting, obtain image data associated with the detected locality; input the obtained image data into a model that outputs likelihood data indicating a likelihood that any portion of the detected locality comprises a given feature of the given type of environment, wherein the model is defined based on training data that includes respective image data for each of a plurality of known instances of the given type of environment; based on the likelihood data, generate output data indicating a location of any portion of the detected locality that is likely to comprise the given feature; and use the output data to simulate asset operation in the detected locality.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
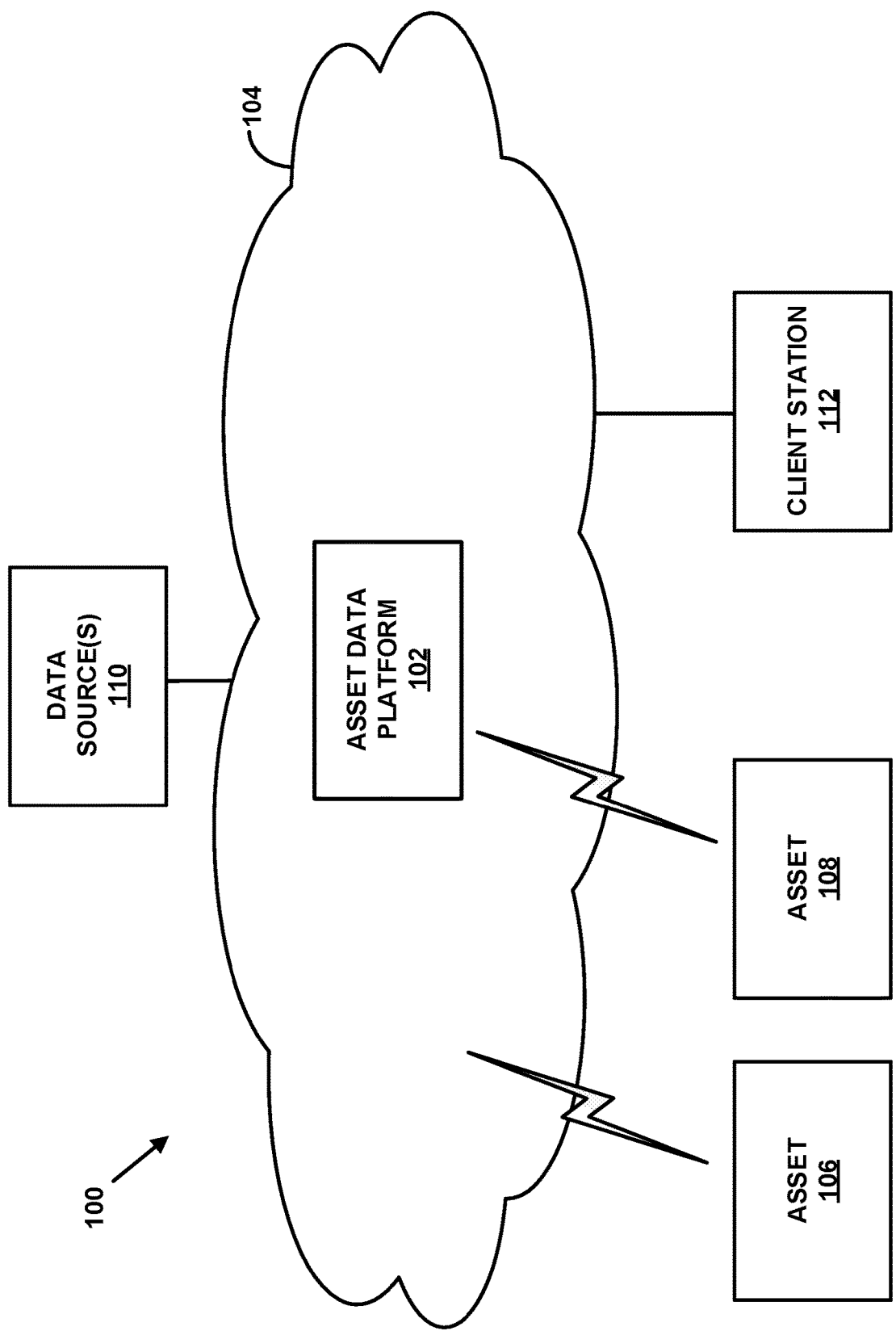
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more output systems, such as representative client station 112. It should be understood that the network configuration may include various other systems as well.

Broadly speaking, the asset data platform 102 (sometimes referred to herein as an "asset condition monitoring system") may take the form of one or more computer systems that are configured to receive, ingest, process, analyze, and/or provide access to asset attribute data. For instance, a platform may include one or more servers (or the like) having hardware components and software components that are configured to carry out one or more of the functions disclosed herein for receiving, ingesting, processing, analyzing, and/or providing access to asset attribute data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets, data sources, and/or output systems in the network configuration 100. For example, the asset data platform 102 may receive asset attribute data, via the communication network 104, that is sent by one or more assets and/or data sources. As another example, the asset data platform 102 may transmit asset attribute data and/or commands, via the communication network 104, for receipt by an output system, such as a client station, a work-order system, a parts-ordering system, etc. The asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, and/or output systems may include one or more intermediate systems. For example, the one or more assets and/or data sources may send asset attribute data to one or more intermediary systems, such as an asset gateway or an organization's existing platform (not shown), and the asset data platform 102 may then be configured to receive the asset attribute data from the one or more intermediary systems. As another example, the asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the asset's attributes, such as the operation and/or configuration of the given asset. This data may take various forms, examples of which may include signal data (e.g., sensor/actuator data), fault data (e.g., fault codes), location data for the asset, identifying data for the asset, etc.

Representative examples of asset types may include transportation machines (e.g., locomotives, aircrafts, passenger vehicles, semi-trailer trucks, ships, etc.), industrial machines (e.g., mining equipment, construction equipment, manufacturing equipment, processing equipment, assembly equipment, etc.), and unmanned aerial vehicles, among other examples. Additionally, the assets of each given type may have various different configurations (e.g., brand, make, model, firmware version, etc.).

As such, in some examples, the assets 106 and 108 may each be of the same type (e.g., a fleet of locomotives or aircrafts, a group of excavators, etc.). In other examples, the assets 106 and 108 may have different asset types or different configurations (e.g., different brands, makes, models, and/or firmware versions). For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by the asset data platform 102. For example, the data source 110 may collect and provide operating data that originates from the assets (e.g., historical operating data), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include image-data servers (e.g., servers maintaining satellite, camera-based, and/or remotely-sensed image data), map-data servers, weather-data servers, global navigation satellite systems (GNSS) servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

The asset data platform 102 may receive data from the data source 110 in various manners. According to one example, the asset data platform 102 may be configured to periodically request and receive data from the data source 110. In another example, the asset data platform 102 may receive data from the data source 110 by "subscribing" to a service provided by the data source. The asset data platform 102 may receive data from the data source 110 in other manners as well.

The client station 112 may take the form of a computing system or device configured to access and enable a user to interact with the asset data platform 102. To facilitate this, the client station may include hardware components such as a user interface, a network interface, a processor, and data storage, among other components. Additionally, the client station may be configured with software components that enable interaction with the asset data platform 102, such as a web browser that is capable of accessing a web application provided by the asset data platform 102 or a native client application associated with the asset data platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Asset

Figure 2:
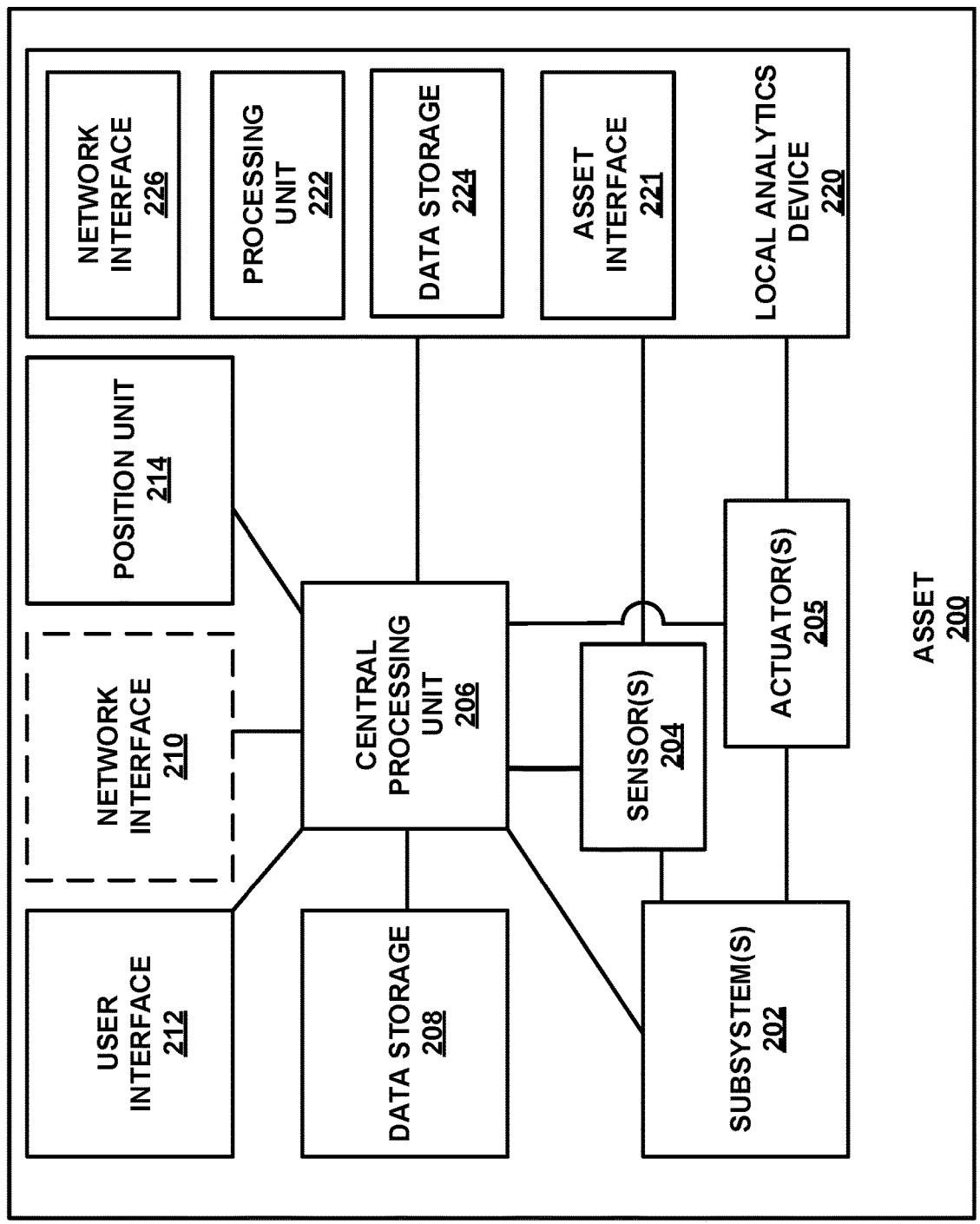
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, throttle positions, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208. Additionally, the central processing unit 206 may be configured to access and/or generate data reflecting the configuration of the asset (e.g., model number, asset age, software versions installed, etc.).

The central processing unit 206 may also be configured to determine whether received sensor and/or actuator signals trigger any abnormal-condition indicators such as fault codes, which is a form of fault data. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
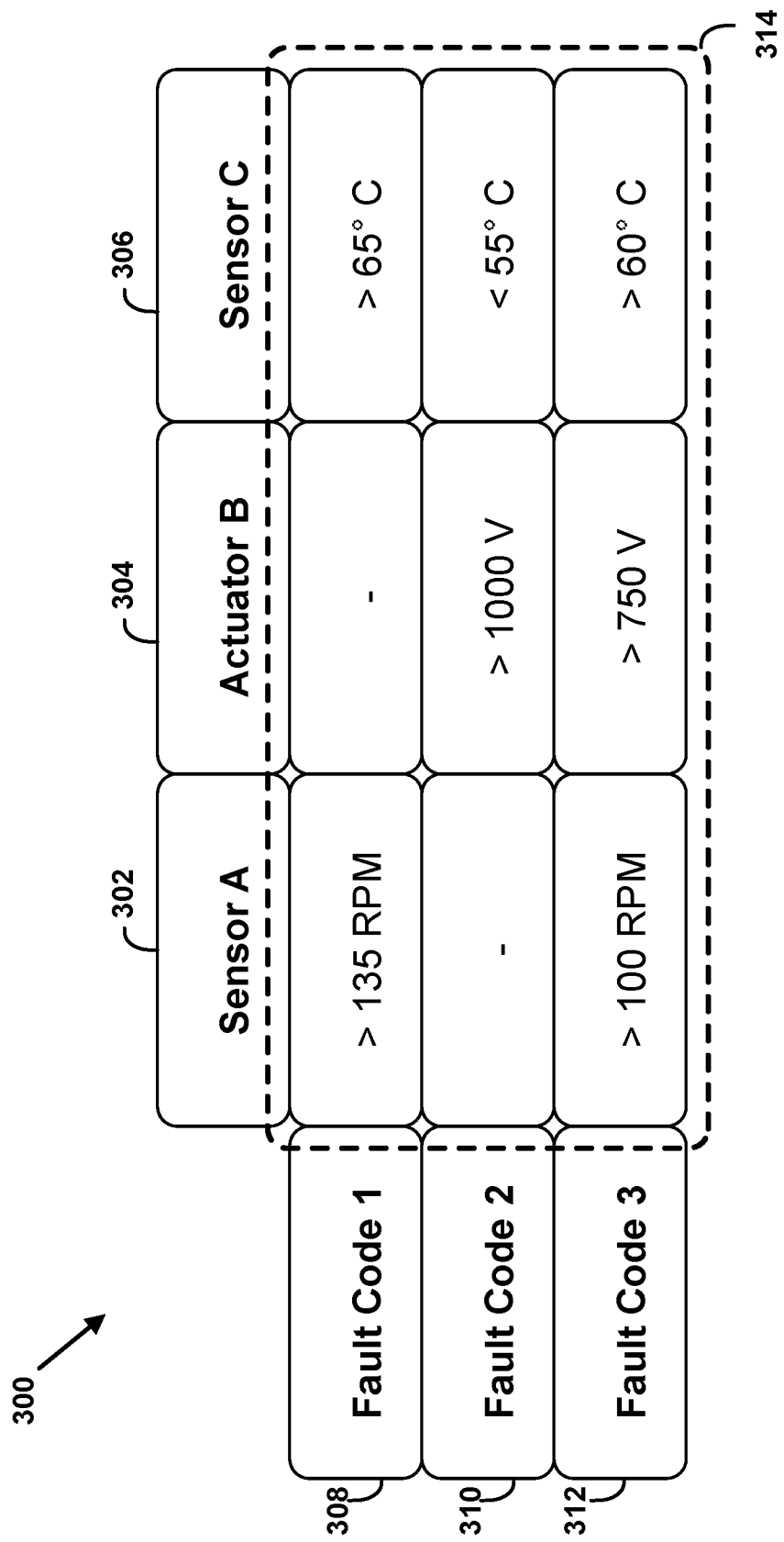
FIG. 3 depicts a conceptual illustration of example abnormal-condition indicators and sensor criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C.), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., the asset data platform 102) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset attribute data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally, or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. Example Platform

Figure 4:
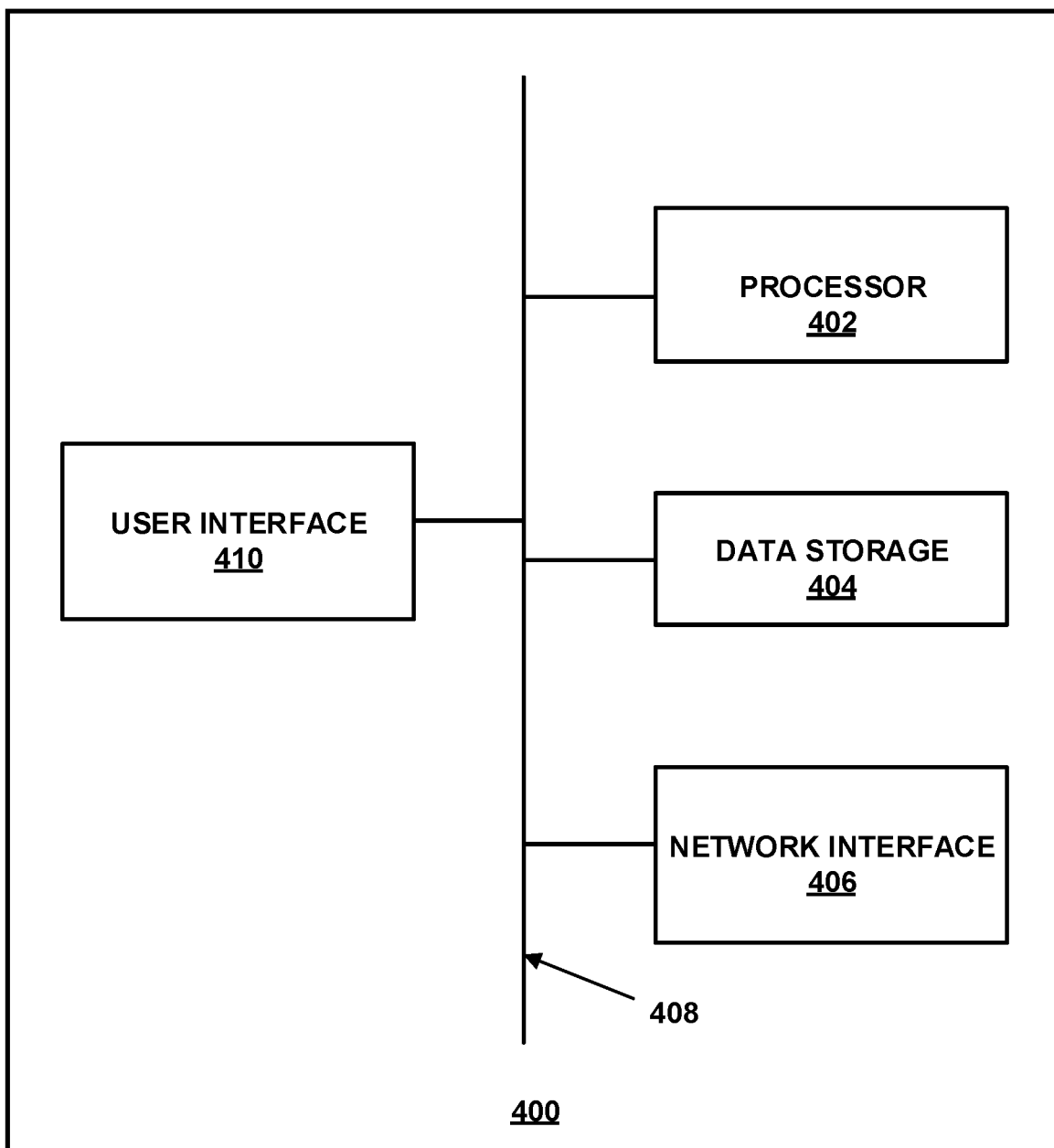
FIG. 4 depicts a structural diagram of an example platform.

FIG. 4 is a simplified block diagram illustrating some components that may be included in an example asset data platform 400 from a structural perspective. In line with the discussion above, the asset data platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as XML, and Base64. Other configurations are possible as well.

The example asset data platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
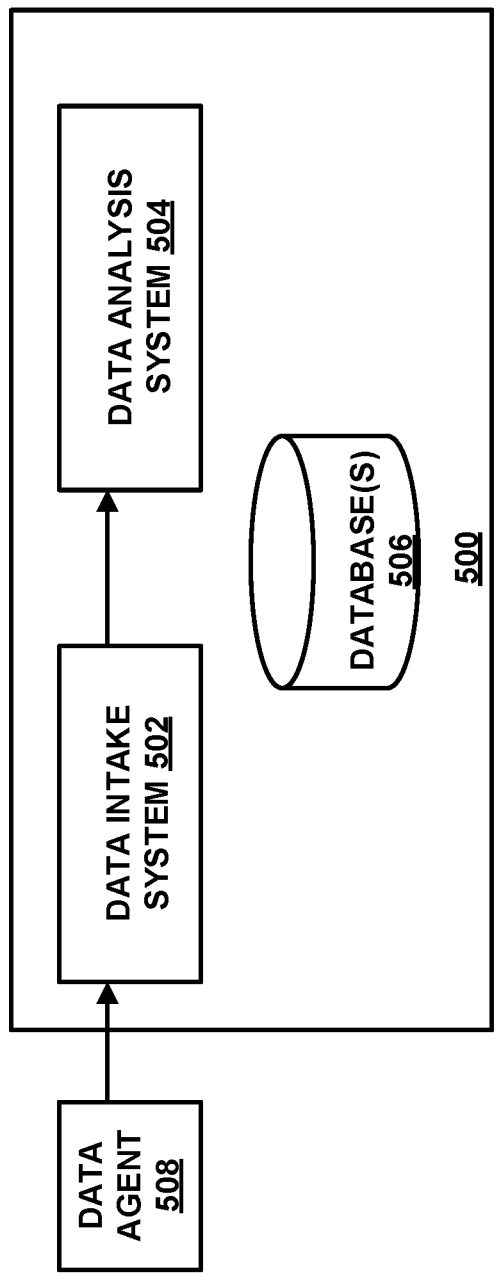
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive asset attribute data and then provide at least a portion of the received data to the data analysis system 504. As such, the data intake system 502 may be configured to receive asset attribute data from various sources, examples of which may include an asset, an asset attribute data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an organization's existing platform/system, an external asset attribute data source, etc.), that source may be provisioned with a data agent 508. In general, the data agent 508 may be a software component that functions to access asset attribute data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting asset attribute data to the example platform 500 without the assistance of a data agent.

The asset attribute data received by the data intake system 502 may take various forms. As one example, the asset attribute data may include data related to the attributes of an asset in operation, which may originate from the asset itself or from an external source. This asset attribute data may include asset operating data such as signal data (e.g., sensor and/or actuator data), fault data, asset location data, weather data, hotbox data, etc. In addition, the asset attribute data may also include asset configuration data, such as data indicating the asset's brand, make, model, age, software version, etc. As another example, the asset attribute data may include certain attributes regarding the origin of the asset attribute data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. These attributes may come in the form of signal signatures or metadata, among other examples. The asset attribute data received by the data intake system 502 may take other forms as well.

The data intake system 502 may also be configured to perform various pre-processing functions on the asset attribute data, in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping certain any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received asset attribute data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received asset attribute data in a first type of database (e.g., a time-series or document database) and may store the associated metadata of received asset attribute data in a second type of database that permit more rapid searching (e.g., a relational database). In such an example, the metadata may then be linked or associated to the asset attribute data stored in the other database which relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset configuration data. The signal data may generally take the form of raw or aggregated data representing the measurements taken by the sensors and/or actuators at the assets. The event data may generally take the form of data identifying events that relate to asset operation, such as faults and/or other asset events that correspond to indicators received from an asset (e.g., fault codes, etc.), inspection events, maintenance events, repair events, fluid events, weather events, or the like. And asset configuration information may then include information regarding the configuration of the asset, such as asset identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be provided via a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing asset attribute data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. Example Operations

Example operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein are improved systems, devices, and methods for intelligently identifying features in an environment where assets may be located. An environment may be a particular locality where assets operate, examples of which may include a mining site, a construction site, a mining site, a construction site, a manufacturing plant, or a distribution center in which assets may operate. The environment may have various features. In one example, the features of an environment may include a boundary which defines an outmost border of the environment. In another example, the features of an environment may include a navigation route over which assets may travel in the environment such as a road or haul route. In yet another example, the features of an environment may include a hazard such as a cliff, steep terrain, or river in the environment which assets should avoid when traveling in the environment. In still another example, the features of an environment may include the assets located within the environment (e.g., mining trucks in a mining site, construction equipment at a construction site, etc.), which may either be stationary or mobile. In a further example, the features of an environment may include structures such as buildings or structures within building such as storage racks. Other types of environment features may exist as well.

Figure 6:
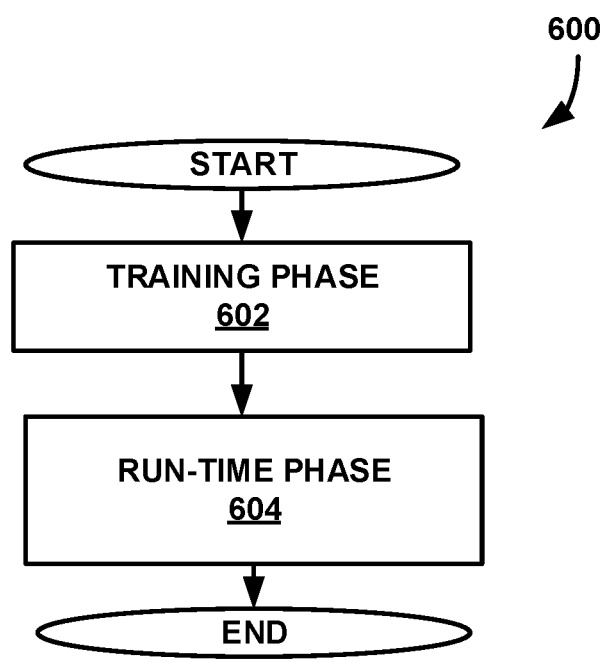
FIG. 6 is a flow diagram of example functions associated with determination of a feature in an environment.

FIG. 6 is a flow chart of example functions 600 associated with determination of a feature in an environment in accordance with embodiments. The platform may generally determine the feature in the environment based on a "training phase" and a "run-time phase." Each phase may be performed, in whole or in part, by the platform.

The "training phase" at 602 may involve defining a model for identifying a given feature in a given type of environment in which an asset operates based on training data. In embodiments, the training data may be image data associated with known instances of a given type of environment which has known instances of a given feature. The platform may receive the image data from the data source and/or be otherwise provided the image data for the known instances. The image data may be associated with a particular locality (e.g., a city, state, country, continent, or some other defined locality) that currently exists or previously existed.

This image data may be of various types. As one example, the image data may be data captured by an imaging satellite. As another example, the image data may be data captured by a camera, which may be included in a wide range of systems, examples of which may include surveillance systems, client stations (e.g., mobile phones), and the assets themselves. As another example, the image data may be data captured by a remote-sensing technique, such as Light Detection and Ranging (LIDAR) for instance. Other types of image data may also be used.

Further, the image data may take various forms. In one embodiment, the image data may comprise a plurality of pixels organized as a multidimensional matrix. For example, the matrix may be a two-dimensional array of pixels where each pixel or group of pixels in the matrix corresponds to a particular portion of a locality. The characteristics of the pixels may vary (e.g., in color, intensity, ordering, organization, structure, etc.) so as to indicate features at the locality. Additional matrix dimensions may be used, for example, to capture additional information such as spatial information, e.g. elevation, and/or time associated with the image data.

Further, the image data may include or be associated with an indication that it is associated with a known instance of a given type of environment, such as whether the environment is a mine site, a construction site, a manufacturing plant, a distribution center, etc. The indication of the given type of environment might be embedded in the image data or otherwise associated with the image data. The indication may uniquely identify the given type of environment. In this regard, the indication may take the form "mine 123" which may specify the type of environment, "a mine," and which mine it is, the one known as "123." Other variations are also possible.

Further yet, the image data may be labeled (e.g., annotated) with data indicative of whether pixels in the image data are representative of a feature in the environment. Specifically, label data may indicate (e.g., label) whether a pixel or set of pixels in the image data is/are associated with a feature. The set of pixels may take the form of raster data or vector data that represents the given feature. Vector data can be converted to raster data and vice versa. In some cases, the set of pixels may be also associated with polylines which encircle the given feature. The label data may be organized in the form of a matrix. For example, the label data may be stored in a two-dimensional matrix. The pixel matrix and label matrix may be correlated such that, for example, if a pixel (or group of pixels) is located at a position (x,y) in the pixel matrix, then a label for the pixel (or group of pixels) may be located at the position (x,y) in the label matrix. The label may indicate whether the pixel (or group of pixels) is/are associated with a feature. It should be noted that the dimensions of the pixel matrix and the label matrix may not be the same, and consequently, a non-trivial mapping may be required. Other variations in organization of the pixels and labels are also possible.

The label data may take a variety of forms. In one embodiment, the label may be a binary indicator. A label with a value of, e.g., 1, may indicate that the pixel or group of pixels is associated with a feature while a value of, e.g., 0, may indicate that the pixel or group of pixels is not associated with a feature. In another embodiment, the label may be a discrete or continuous value indicative of how closely associated the pixel or group of pixels is to a feature. The label may range from 0 to 100 such that a value of 90 indicates that the pixel or group of pixels is more likely to be representative of a feature or while a value of 20 indicates that the pixel or group of pixels is less likely to be representative of the feature. The label may additionally include an identification of a type of feature, e.g., a label "navigation route" may indicate that the pixel or group of pixels is associated with a navigation route feature while a label "boundary" may indicate that the pixel or group of pixels is associated with a boundary feature.

In practice, the label may also include and/or be associated with location data which identities a location of the feature. In one example, the location data label may be indicated by geographic coordinates associated with the image data, such as latitude and/or longitude, Cartesian coordinates, among other coordinate representations. The coordinates may identify a physical location of the feature and may be associated with the portion of the image data that represents the feature. In another example, the location data label may be an offset value. The image data may correspond to a locality having a geographic location such as an (x,y) coordinate. The location data label then may indicate the location of the feature by defining an offset value (a,b) from the (x,y) location. In this regard, a physical location of the feature may be (x+a, y+b). The pixels or group of pixels may be labeled in other ways as well. The labeled image data may be also referred to herein as "training data."

The asset data platform may define a model for identifying a given feature in a given type of environment based on this training data. For example, a machine learning technique such as supervised learning may be applied to the training data to define a model for identifying a given feature in a given type of environment.

In practice, the training process may involve analyzing the training data to define a relationship between (1) characteristics of pixels associated with a known instance of a given feature in a known instance of a given type of environment and (2) a likelihood that such pixels are representative of the given feature in the instance of the given environment.

The training data may include a plurality of image data. The image data may be known instances of a given type of environment with labels identifying known instances of a given feature. Characteristics of the pixels associated with and not associated with a given feature may be analyzed in view of the labels to determine the relationship between the characteristics of the pixels and a likelihood that such pixels are representative of the given feature. The relationship may be embodied in a model that can identify a given feature in image data where there is no indication of the given feature in the image data such as a label. In practice, the model may take as input image data and provide an output indicating whether any portion of the image data is representative of the given feature, e.g., a likelihood value. This output may take various forms such as a set of likelihood values that corresponds to subsets of the image data (e.g., subsets of pixels) and indicates the likelihood that each subset of the image data is representative of the given feature. This set of likelihood values may be thought of as a two-dimensional matrix of likelihood values, where each value corresponds to a two-dimensional area within the given locality.

It should be understood that a given type of environment may have multiple features of interest, in which case the asset data platform may define a model for each feature of interest that the platform wishes to identify for the given type of environment. It should also be understood that the features of interest may differ for different types of environments, and thus in some implementations, the asset data platform may define different models for different types of environments. In other implementations, the asset data platform may define models for features that are common to multiple types of environments.

In some implementations, the training phase 602 may additionally define the model based on other types of data. For example, in addition to image data, the training data used to define the model for identifying a given feature in a given type of environment may also include asset attribute data for assets in a known instance of given type of environment that may have a relationship with the given feature. Such asset attribute data may be received from the asset, another platform, or some other data source. Further, such asset attribute data may take a variety of forms, examples of which may include asset identifiers, asset operating data (e.g., signal data, fault data, etc.), asset configuration data (e.g., brand, make, model, age, software version, etc.), and asset location data. (In some contexts, the asset attribute data may also be referred to herein as "telematics data"). In this case, a relationship may be determined between characteristics of the pixels in image data associated with an environment, asset attribute data associated with assets operating in the environment, and the likelihood that the pixels and asset attribute data are representative of a given feature in the given type of environment.

During the "run-time" phase, at 604, the platform may be configured to intelligently identify the existence (and location) of one or more features of interest in a given type of environment based on image data, asset attribute data, and/or one or more models defined during the training phase.

The platform may begin this phase by monitoring asset attribute data for assets in the field to detect any locality in which there is a grouping of assets indicative of an instance of a given type of environment (e.g., a mining site, a construction site, a mining site, a construction site, a manufacturing plant, a distribution center, etc.). The platform may consider a number of assets in a given locality, a distance between assets, and/or a type of the assets, among other considerations to detect a locality that is possibly an instance of a given type of environment.

After detecting a locality that is possibly an instance of a given type of environment, the platform may obtain image data associated with the detected locality (e.g., from an external data source and/or from the platform's data storage). In turn, the platform may apply one or more of the models defined in the training phase to the obtained image data (as well as any asset attribute data that is relevant to the model being applied), where each model outputs a likelihood that the detected locality includes a respective feature of interest (e.g., an indication of whether any portions of the image data are likely to be representative of a respective feature of interest).

Based on the output of the model, the asset platform may generate output data that indicates whether any portion of the detected locality that is likely to comprise a feature of interest, which may be presented to a user in various manners. For example, the platform may facilitate asset simulation based on the output data or present the output data as part of a visualization of the detected locality, which may take the form a map showing the feature(s) of interest in the environment.

In this regard, the training phase and run-time phase facilitates intelligent identification of features of an environment.

Figure 7:
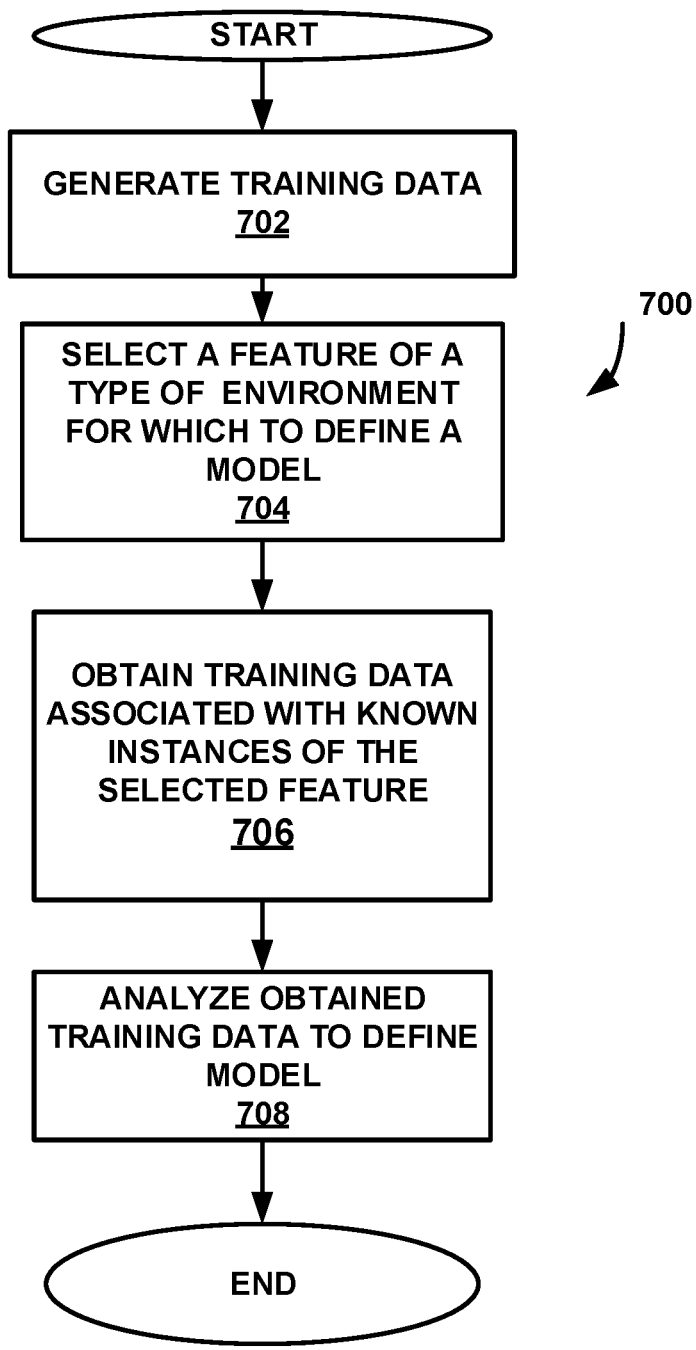
FIG. 7 is a flow diagram of example functions associated with a training phase.

Turning now to FIG. 7, a flow diagram 700 is shown to illustrate example functions that may be carried out during an example training phase. For purposes of illustration, the example training phase is described as being carried out by the platform but could be performed by systems other than the platform or which work in conjunction with the platform. One of ordinary skill in the art will appreciate that the flow diagram 700 is provided for sake of clarity and explanation. Numerous other combinations of operations may be utilized in determining the model including, but not limited to, the training phase being performed offline with or without human intervention.

Briefly, at block 702, training data is generated. At block 704, a given feature of a given type of environment is selected for which to define a model. At block 706, training data associated with known instances of the given feature is obtained. At block 708, the obtained training data is analyzed to define a model for identifying whether a given locality includes the given feature of interest.

The platform may manage assets operating in a variety of different types of environments. In managing the assets, the platform may obtain and/or have access to image data associated with instances of the different types of environments in which the assets are operating. The image data may be received from a data source, such as an image-data server that maintains satellite, camera-based, and/or remotely-sensed image data.

Referring back, at block 702, training data for use in training the models disclosed herein may be generated. The training data may be generated based on analyzing image data. The image data may be analyzed to identify from instances of different types of environments, instances of a given type of environment and features of interest in the given type of environment.

The instances of a given type of environment may be identified in a variety of ways. For example, image data may be presented to one or more users. The one or more users may be trained and/or otherwise familiar in recognizing image data associated with a given type of environment. The user may analyze the image data, determine the type of environment, and input the identification into a system, which may either be part of the platform or separate therefrom. For example, the user may input the identification via a user input device such as a mouse, keyboard, touchscreen. The type of environment may be stored as an indication with the image data.

The instances of the given type of environment may also have one or more features of interest. The feature of interest may be a boundary, navigation routes, hazards etc. The one or more users may also analyze the image data associated with each instance of the given type of environment and identify any features of interest within the image data. The user may analyze the image data, identify the features of interest, and record the identification. Again, the user may input the identification of the features via a user input device such as a mouse, keyboard, touchscreen into a system, which may in turn associate pixels or groups of pixels in the image data to the identified feature. The pixels or group of pixels may be associated to the feature with the label data. The analyzed image data may serve as training data for defining a model which identifies a given feature in a given type of environment.

In the event that the training data is defined outside of the platform, the platform may then be configured to obtain this training data from another source (e.g., the system on which the training data is defined). Other variations are also possible.

At block 704, a given feature of a given environment for which a model is to be defined may be selected. In one example, the platform may select the feature and environment based on user input, which may be received from a client station via a network, which indicates this given feature of the given environment. In another example, the platform may select the given feature of the given environment without user input (e.g., using machine learning techniques).

At block 706, training data associated with known instances of the given feature in known instances of the given type of environment may be obtained (e.g., from the platform's data storage and/or from another system). In embodiments, the training data may be image data for known instances of the given type of environment that are known to include instances of the given feature, which may be labeled with data indicating that certain portions of the image data (e.g., pixels or groups of pixels) are representative of the given feature.

At block 708, the training data may be analyzed to define a model for identifying whether a given locality includes the given feature of interest. In general, this function may involve (1) analyzing the training data to define a relationship between characteristics of pixels within image data and a likelihood that such pixels are representative of the given feature and then (2) embodying the relationship into a model for identifying whether a given locality includes the given feature of interest. Further, various modeling techniques may be used to carry out this function, examples of which may include computer vision and image processing techniques such as edge detection or principal component analysis (PCA), etc., and/or machine learning techniques, supervised and unsupervised, such as random decision forests, logistic regression, k-means clustering, k-nearest neighbor (KNN) classification, DBSCAN clustering, artificial neural networks, and support vector machines, etc. (as well as combinations of two or more of these techniques). Metrics that measure the quality of fit of the model to the training data may also captured in block 708 for purposes of quantifying future performance and reliability of the model.

According to one example embodiment, the label data in the training data may provide an indication of the given feature in the image data. Based on the label data, the platform may be able to identify pixels associated with the given feature and pixels not associated with the given feature. Characteristics of the pixels (e.g., color, intensity, ordering, organization, structure, etc.) associated with the given feature and/or not associated with the given feature may be considered. Based on this analysis, some characteristics of the pixels may be indicative of the given feature in the given environment and some characteristics of the pixels may not be indicative of the given feature. A relationship between the characteristics of pixels and a likelihood that the pixels are representative of the given feature may be defined based on this analysis. In turn, this relationship may be embodied into a model for identifying whether a given locality includes the given feature of interest that (1) takes as input image data and (2) provides an output indicating whether any portion of the input image data is representative of the given feature. The output of this model may take various forms.

In one implementation, the output of the model may be a set of likelihood values that each correspond to a particular portion of the input image data and each indicate a likelihood that the corresponding portion of the image data is representative of the given feature. For example, the model may output a set of likelihood values that each indicate how likely it is that a given subset of pixels in the image data is representative of the given feature, which may take the form of a boundary, a navigation route, a hazard, etc. In this regard, higher likelihood values may indicate that pixels are more likely to be representative of the given feature while lower likelihood values may indicate that pixels are less likely to be representative of the given feature.

In this implementation, the set of likelihood values may be organized in a manner that tracks the organization of the image data, in order to represent the correlation between the respective likelihood values and the respective portions of the image data. For instance, if the image data takes the form of a two-dimensional matrix of pixels (or the like), then the set of likelihood values may also take the form of a two-dimensional matrix of likelihood values, where each likelihood value in the likelihood-value matrix corresponds to the portion of the image data (e.g., the subset of pixels) located at the same position within the image-data matrix.

A simplified illustration of this organizational structure is shown in Tables 1-2 below:

TABLE 1

(Image Data)

| | | |
|---|---|---|
| $I_{NW}$ | $I_N$ | $I_{NE}$ |
| $I_W$ | $I_C$ | $I_E$ |
| $I_{SW}$ | $I_S$ | $I_{SE}$ |

TABLE 2

(Likelihood Values)

| | | |
|---|---|---|
| $L_{NW}$ | $L_N$ | $L_{NE}$ |
| $L_W$ | $L_C$ | $L_E$ |
| $L_{SW}$ | $L_S$ | $L_{SE}$ |

As shown, Table 1 illustrates image data for a given locality that has been sub-divided into a northwest portion $I_{NW}$, a north portion $I_N$, a northeast portion $I_{NE}$, a west portion $I_W$, a central portion $I_C$, an east portion $I_E$, a southwest portion $I_{SW}$, a south portion $I_S$, and a southeast portion $I_{SE}$. In turn, Table 2 illustrates likelihood values that correspond to the respective portions of image data illustrated in Table 1. The image data and the set of likelihood values may be organized in various other manners as well.

Additionally or alternatively, the model may output data indicating which portions of the image data correspond to which likelihood values. This data may take various forms, examples of which may include geographic coordinates for the respective portions of the image data and/or pointers to the respective portions of the image data.

In another implementation, the output of the model may comprise an image processed version of the image-data matrix. For example, the border of image-data cells with likelihoods that exceed a threshold may be used to extract the boundary of a feature. As another example, a skeleton of transportation routes comprised of the collection of connected nodes may be constructed from the image-data cells. The output of the model may take various other forms as well.

It should also be understood that a given type of environment may have multiple features of interest, in which case the platform may repeat blocks 704-708 to define a model for each different feature of interest that the platform wishes to identify for a given type of environment. It should also be understood that the features of interest may differ for different types of environments, and thus in some implementations, the asset data platform may define different models for different types of environments. In other implementations, the asset data platform may define models for features that are common to multiple types of environments.

In some implementations, the platform may define the model for identifying a given feature in an instance of a given type of environment based on other types of training data, such as asset attribute data. For instance, certain attributes of assets located at a locality may provide additional insight into whether or not the given locality includes the given feature. As one example, asset attributes such as asset location and asset speed may provide an indication of how assets are moving at a given locality, which may provide insight into the existence and location of navigation routes, boundaries, and/or other features within the area. As another example, asset attributes such as asset location and asset weight may provide insight into the existence and location of dump sites/routes and/or loading sites/routes at the locality (e.g., increases in asset weight at a given location may indicate a loading site/route and decreases in asset weight at a given location may indicate a dump site/route). As another example, asset attributes such as asset elevation of an asset may provide insight into the existence and location of hills, valleys, or the like at the locality. Many other examples are possible as well.

If a given asset attribute is identified as potentially being indicative of a given feature, then data for the given asset attribute may be included in the training data used to define a model for identifying the given feature. For instance, as part of generating the training data at 702, asset attribute data for assets located in known instances of a given type of environment may be analyzed, and measured values of the given asset attribute may be labeled to indicate which measured values of the given asset attribute were associated with the given feature and which measured values of the given asset attribute were not associated with the given feature. As one representative example, asset attribute data for assets that are co-located with a given feature (e.g., assets that are located on a known navigation route) may be labeled with a positive label and asset attribute data for assets that are not co-located with the given feature (e.g., assets that are not located on a known navigation route) may be labeled with a negative label. In line with the discussion above, the label may take the form of a binary indicator and/or a relative indicator (e.g., a score from 0 to 100). In turn, the system may access and train on the labeled data for the given asset attribute in the same manner that it accesses and trains on the image data.

In some embodiments, the model generated by the platform may be validated based on asset attribute data before the model is used in the run-time phase. The platform may have test image data associated with a known instance of a given type of environment and test asset attribute data of assets operating in the known instance of the given type of environment. The test image data may be input into the model and the model may output a likelihood of a portion of the test image representative of a feature. The test asset attribute data may be used to verify the output by the model is correct. For example, image data may be input into a model and the model may output likelihood values which correspond to a vector of coordinates of a route in the environment. The platform may determine the location of assets in the environment based on asset attribute data associated with a known instance of the given type of environment. If the assets are located in proximity to some of the coordinates of the route indicated by the model, then the model may be operating properly and turned over to the run-time phase. If the assets are not located in proximity the coordinates of the route indicated by the model, then the model might not be operating properly and require more training on image data.

The run-time phase may involve identifying a given feature in a given type of environment based on image data associated with the environment, asset-attribute data, and the one or more models defined during the training stage.

Figure 8:
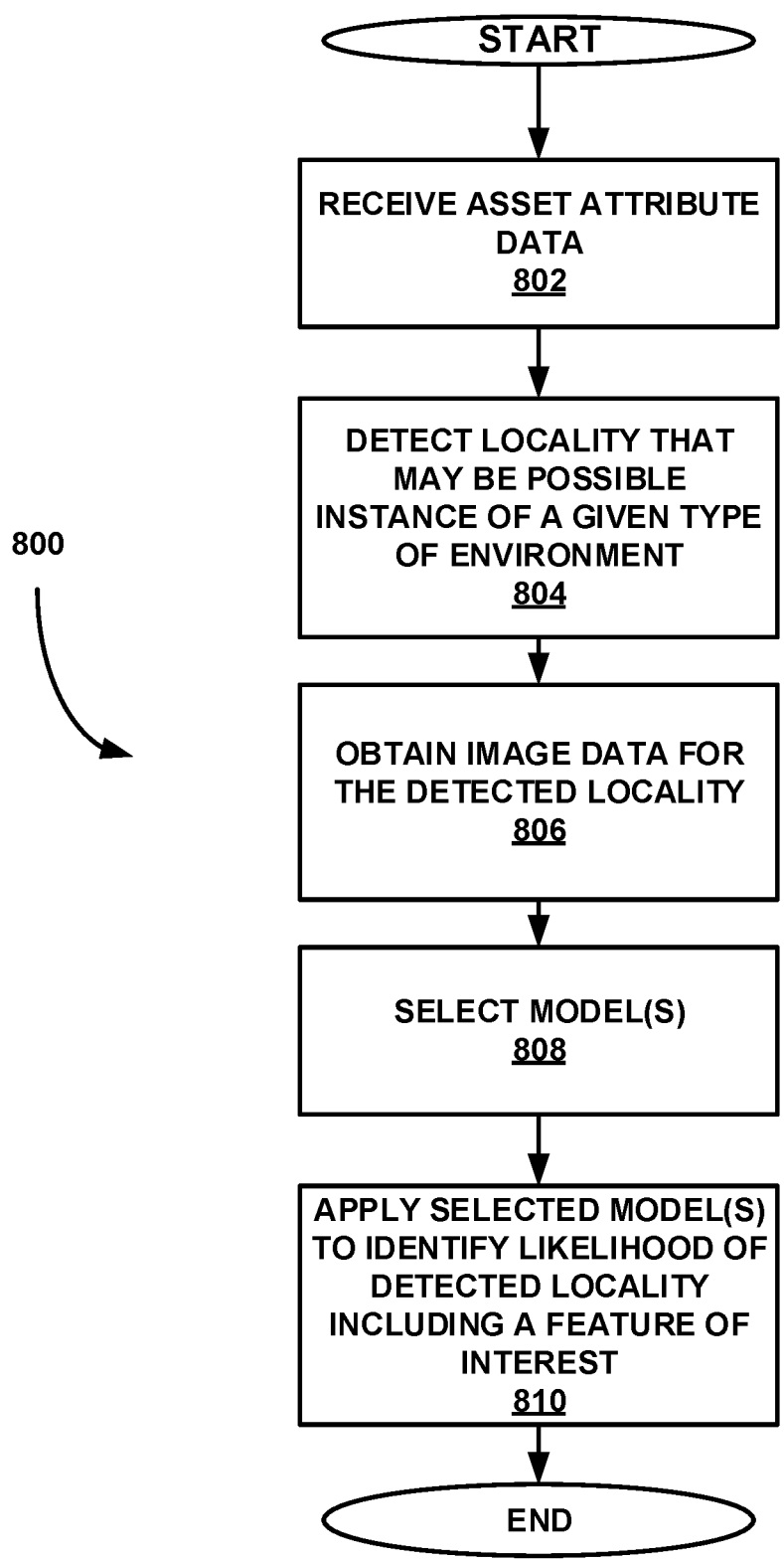
FIG. 8 is a flow diagram of example functions associated with a run-time phase.

FIG. 8 is a flow diagram 800 of example functions associated with the run time phase. For purposes of illustration, the example run time phase is described as being carried out by the platform but could be performed by systems other than the platform or which work in conjunction with the platform. One of ordinary skill in the art will appreciate that the flow diagram 800 is provided for sake of clarity and explanation. Numerous other combinations of operations may be utilized in determining the model including, but not limited to, the training phase being performed offline with or without human intervention.

Briefly, at block 802, asset attribute data may be received for a plurality of assets out in the field. At block 804, based on the received asset attribute data, a locality that may be a possible instance of a given type of environment is detected. At block 806, image data associated with the detected locality is obtained. At block 808, one or more models may be selected for one or more features associated with the given type of environment. At block 810, each selected model may be applied to the obtained image data to identify a likelihood of the detected locality including a respective feature of interest for the given type of environment.

Referring back, at block 802, asset attribute data may be received for assets located in the field. The platform may receive this asset attribute data from the assets themselves or from some other data source (such as another platform). As noted above, it should also be understood that the platform may be configured to receive asset attribute data for a large number of assets (e.g., thousands or more) that may be located in various regions throughout the world. This asset attribute data may take a variety of forms, examples of which may include asset identifiers, asset location data, asset operating data (e.g., signal data, fault data, etc.), asset configuration data (e.g., brand, make, model, age, software version, etc.).

At block 804, the asset attribute data may be monitored to detect any locality that is a possible instance of the given type of environment. For instance, one or more rules may be applied to the asset attribute data to monitor for and detect any locality that is a possible instance of the given type of environment. Types of asset attribute data that may be monitored may include asset location, asset type, and asset fault data, among many others. For example, one rule may be that if a threshold number of a related type of asset (e.g., assets of the same type, brand, make, model, etc.) are located within a threshold distance of one another (e.g., within a half mile), then the locality where the assets are located may be a possible instance of the given type of environment. Additional asset attribute data may also be used to further identify the type of environment. For example, the type of assets at a given locality may provide an indication of the type of environment. As another example, the fault condition of assets at a given locality may provide an indication of the type of environment (e.g., if there is a threshold number of assets that have mechanical or electrical issues, it may be determined that the locality is a repair shop rather than an environment of interest). The platform may detect a locality that is a possible instance of a given type of environment in other ways as well.

The rules may be configured in a variety of ways. In one example, the rules may be defined based on user input at a client station. In another example, the rules may be received from another platform and used on the platform. Other variations are also possible.

When the locality is detected, the particular type of environment may also be determined based on the asset attribute data. For example, the asset data platform may be able to determine based on the asset attribute data that the detected locality appears to be a mine site, a construction site, a manufacturing plant, a distribution center, a railroad network, a logistics center, or the like. In another examples, however, the asset data platform may only be able to determine based on the asset attribute data that the detected locality appears to be an unspecified type of environment appears. Other examples are possible as well.

At block 806, image data may be obtained for the detected locality. The image data may be identified based on the asset attribute data, such as location data for assets at the detected locality. The platform may use the asset attribute data to determine a general location associated with the detected locality, and may then obtain image data for this general location. In line with the discussion above, this image data may take various forms and be obtained from various sources.

In some embodiments, the image data may be captured at a similar time to when the asset attribute data was received, e.g., from an asset. The asset attribute data and/or the image data may each have timestamps to validate or correlate data received at a similar time. The platform may obtain the image data for the instance of the given type of environment by retrieving the image data which was captured when the asset attribute data was received.

After obtaining the image data, the platform may apply one or more models defined in the training stage to the image data to determine whether any portion of the image data is representative of a given feature. The platform may be configured to perform this function on the obtained image data either in "real-time" (e.g., around the time that the locality is detected and the image data is obtained) or at some later point in time when previously-obtained image data may be analyzed either singly or in a batch. Further, this function may take various forms.

At block 808, one or more models may be selected for one or more features that may exist within the detected locality. To the extent that the platform is able to determine the particular type of environment that appears to exist at the detected locality, this selection may be based on that determined type of environment. For instance, as noted above, different types of environments may have different types of features, and the platform may define different models for these different features. As such, the platform may select the one or more model for identifying the one or more feature that are related to the determined type of environment (where each model may either be unique to the determined type of environment or may be common to other environment types. However, in other instances, the platform may not be able to determine the particular type of environment that appears to exist at the detected locality, in which case the asset data platform may choose to apply models for various different types of environments.

In some instance, the model that is selected may also be based on the metrics that measure the quality of fit of the model to the training data. The model may be selected based on the metrics meeting one or more thresholds. If the metrics exceed the one or more thresholds, then the model may be selected. If the metrics do not exceed one or more thresholds, then the model may not be selected. Other variations are also possible.

At block 810, each selected model may be applied to the obtained image data to identify a likelihood of the detected locality including a respective feature of interest. For instance, the platform may input the obtained image data into each selected model. In the event that the model was trained on certain asset attributes along with image data, the platform may also be configured to access the relevant asset attribute data for assets located in the detected locality and then input that asset attribute data into to the model as well. In turn, each selected model may output a likelihood that the detected locality includes the respective feature for which the model has been defined. In line with the discussion above, the output of each selected model may include a set of likelihood values that each corresponds to a particular portion of the obtained image data (e.g., a subset of pixels) and each indicates the likelihood that the corresponding portion of the image data is representative of the given feature. Thus, applying the selected one or more models may result in the platform generating one or more sets of likelihood values, where each set of likelihood values enables the platform to ascertain the existence and location of a respective feature (e.g., a boundary, navigation route, hazard, etc.) within the detected locality.

As one illustrative example, the platform may detect a locality that appears to be a possible instance of a mine site, which may include features such as a boundary and a navigation route. In response to this detection, the platform may obtain image data for the detected locality and then apply two models to the image data: (1) a first model for identifying a boundary of a mine site and (2) a second model for identifying a navigation route in a mine site. As a result of applying these two models, the platform may generate two sets of likelihood values: (1) a first set of likelihood values that indicates a likelihood that any portion of the detected locality comprises a boundary of a mine site and (2) a second set of likelihood values that indicates a likelihood that any portion of the detected locality comprises a navigation route of a mine site.

A simplified illustration of the first and second set of likelihood values is shown in Tables 3-4 below:

TABLE 4

(Navigation Route)

| | | |
|---|---|---|
| 80 | 10 | 0 |
| 10 | 90 | 10 |
| 0 | 10 | 80 |

TABLE 3

(Boundary)

| | | |
|---|---|---|
| 90 | 80 | 50 |
| 80 | 50 | 10 |
| 50 | 10 | 0 |

As shown, Table 3 illustrates an example set of likelihood values (e.g., probabilities from 0-100) indicating that a boundary is likely to exist in the northwest portion of this segment of image data, and Table 4 illustrates an example set of likelihood values (e.g., probabilities from 0-100) indicating that a diagonal navigation route is likely to extend from the northwest corner to the southeast corner of this segment of image data.

Based on the output of the selected model(s), the platform may then generate output data indicating whether any portion of the detected locality is likely to comprise a feature of interest. This output data may take various forms and be used for various purposes.

According to one example, the output data may include a simple indicator of whether or not the detected locality is likely to comprise a given feature of interest. To generate this indicator for a given feature, the platform may compare each likelihood value for the given feature to a threshold value and thereby determine whether any portion of the image data is likely to comprise the given feature. For example, if any portion of the image data has a likelihood value for a given feature that is at or above the threshold value, the platform may determine that the detected locality is likely to comprise the given feature and may generate an indicator to reflect this determination. On the other hand, if no portion of the image data has a likelihood value for the given feature that is at or above the threshold value, the platform may determine that the detected locality is not likely to comprise the given feature and may generate an indicator to reflect this determination.

According to another example, the output data may include location data (e.g., geographic coordinates such as latitudes and longitudes coordinates or Cartesian coordinates) for any portion of the detected locality likely to comprise a feature of interest. To generate this location data for a given feature, the platform may compare each likelihood value for the given feature to a threshold value and thereby identify which portions (if any) of the image data are likely to comprise the given feature. For example, the platform may identify any portion of the image data having a likelihood value for the given feature at or above the threshold value may be identified as being representative of the given feature, and the platform may then extract location data for these portions of the image data. The platform may generate location data for portions of the detected locality likely to comprise features of interest in other manners as well.

The location data generated by the platform may also take various forms. In general, this location data may take the form of a set of geographic coordinates that defines the given feature. For example, if the given feature is a navigation route such as a road, the location data may take the form of a set of geographic coordinates that defines the starting point, the ending point, and perhaps other points along the navigation route. As another example, if the given feature is a boundary of an environment such as a mine site, a farm, etc., the location data may take the form of a set of geographic coordinates for a plurality of locations along that the boundary. As yet another example, if the given feature is a loading site or unloading site for assets, the location data may take the form of a single geographic coordinate where that loading/unloading site is located. The location data may take other forms as well, including values other than geographic coordinates.

According to yet another example, the output data may include likelihood values of features of interest for the detected locality. In another example, the output data may take the form of a "heat map" depicting a spatial distribution of likelihood values of features of interest by varying color indicative of the feature of interest and/or likelihood value. The output data may take various other forms as well.

In some embodiments, asset attribute data could be used to validate the output of the model. For example, the model may output likelihood values which correlate to a vector of coordinates of a route in the environment. The platform may determine the location of assets, e.g., GPS location, in the environment based on asset attribute data associated with the environment. If the assets are located in proximity to some of the coordinates of the route indicated by the model, then route indicated by the model may be valid. If the assets are not located in proximity the coordinates of the route indicated by the model, then feature indicated by the model may not be valid.

The platform may use the output data in a variety of ways. In one embodiment, the platform may store the output data for later access and review by appropriately trained users who may need to determine whether features may be present in the environment of interest.

In another embodiment, the asset data platform may use the output data to simulate asset operation at the detected locality. The output data, indicative of real-world asset operations, may be input into a simulation model. The simulation model may use the output data and define a virtual environment to predict future real-world performance of assets. In some instances, the simulation model, once constructed at an appropriate level of granularity, may be validated against real-world asset operations before being used. Various techniques may be employed to perform this simulation ranging from spreadsheet calculations to more complex discrete event simulations (DES), agent-based modeling systems (ABMS), etc.

The use of the output data in the simulation of asset operation at the detected locality may take various forms. In one instance, the platform may use the output data to assist in defining the initial conditions of a simulation model, such as the location of each feature in the locality that is to remain static during the simulation and the initial location of each feature in the locality that is intended to change during the simulation.

In another instance, after defining the initial conditions of a simulation model, the platform may run the simulation model to predict movement of assets at the locality over some period of time, thereby resulting in new, simulated location of certain assets at the locality at some later point in time. In turn, the platform may then compare the simulated location of the asset at this later point in time to output data for the locality at that same point in time, which may then enable the platform to perform various other actions. For example, based on this comparison, the platform may validate and verify the simulation model. As another example, based on this comparison, the platform may identify differences between the predicted movement of assets and the actual movement of the assets, which may provide insight into the operate of the assets.

In yet another instance, the platform may run the simulation model to predict movement of certain assets at the detected locality in view of the identified environment features (e.g., the boundary, one or more routes, etc.) and calculate metrics such as travel time, congestion, fuel consumption, which may then be used to optimize asset operation in the detected locality (e.g., by routing assets in a manner to minimize one or more of these metrics).

In still another instance, the platform may use different sets of output data for a locality to define starting and ending times for a simulation and then simulate the operation of assets at the locality during the period between these starting and ending times, which may enable the platform to impute asset attribute data (e.g., asset location, asset speeds, etc.) for the assets during this period. This ability to impute asset attribute data may be particularly useful in situations where asset attribute data is missing (e.g., due to failed transmissions or the like) and/or where assets are obstructed in certain image data (e.g. due to cloudy weather or the like).

In a further instance, if the platform identifies an environment feature at the detected locality a later time than the start of the simulation, the platform may then insert the feature into the simulation model at the appropriate simulation time.

The simulation of asset operation at the detected locality—and the use of the output data in that simulation—may take various other forms as well.

In yet another embodiment, the platform may cause a client station to display the output data in various forms. For example, the platform may cause a client station to display the output data in the form of text. As another example, the platform may cause a client station to display the output data in the form of map which may show the geographic location of the detected locality and any features likely to be located therein, such as possible locations of an environment boundary, navigation routes in the environment, and/or hazards, among other features.

Figure 9:
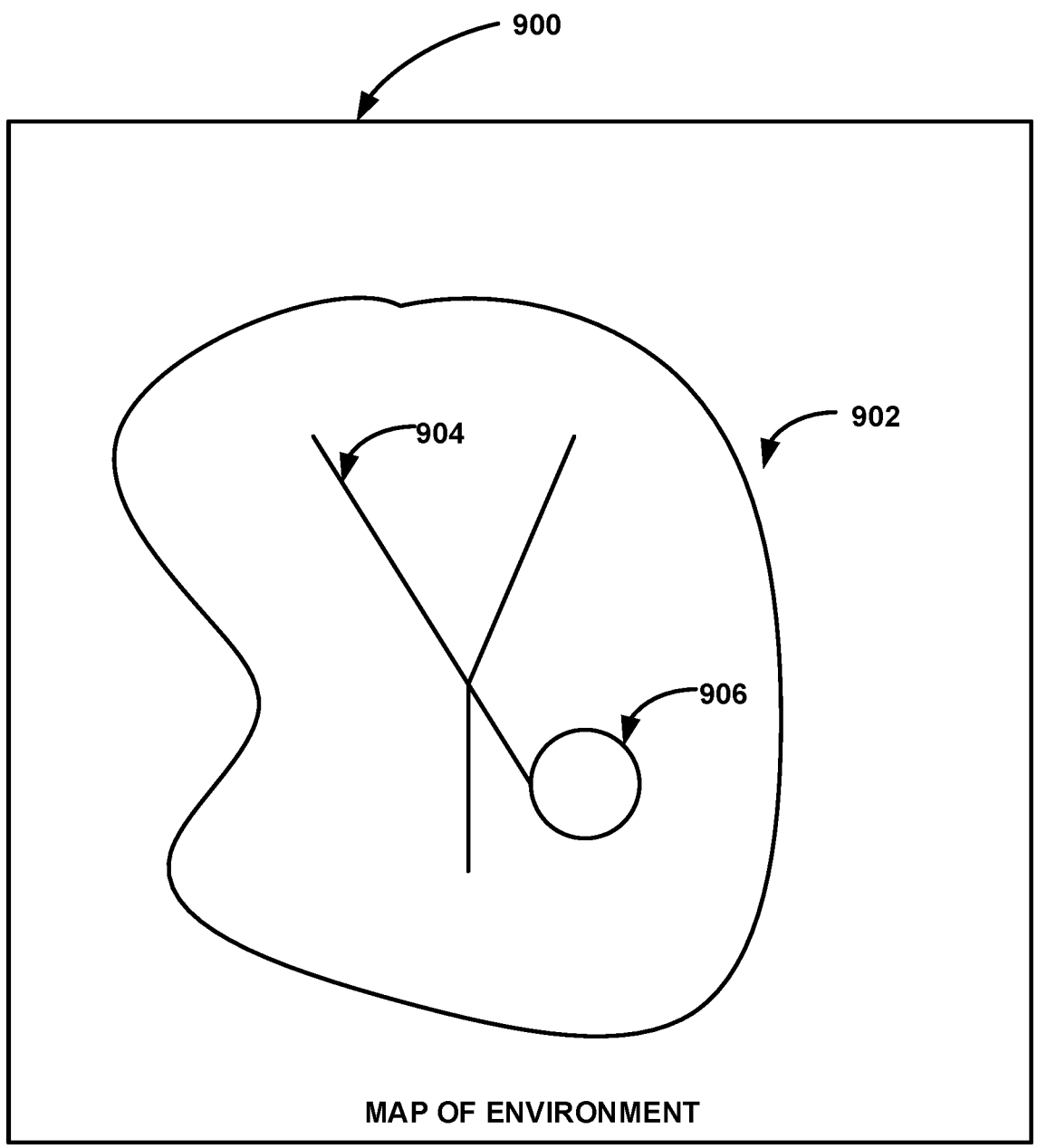
FIG. 9 shows example output data of the platform presented on a display of a client station.

FIG. 9 shows an example map 900 that the platform may cause to be displayed on the client station. The map 900 may show various features of the environment which was identified based on the model. The boundaries are shown as 902 of the environment, the navigation routes are shown as 904 in the environment, and/or a hazard such as a hill as 906. Pixels representative of a feature in the image data may have been identified based on comparing a likelihood value to a threshold and indicating the feature in the map if the likelihood value exceeds the threshold. The positioning the feature in the map 900 may be based on the correlation between the likelihood values and the image data. For example, a likelihood value in a matrix of likelihood values may correspond to pixels in the matrix of image data and the pixels in the image data may correspond to a particular location within the detected locality. In this regard, the platform may be able to output a map which shows the physical location of the feature in the detected locality.

According to yet another embodiment, the asset data platform may use the output data for the detected locality to monitor for any changes to the detected locality. By nature, environments may dynamically change over time. For example, the boundaries of an environment may be altered as mine resources are extracted, asset navigation routes within an environment may increase or decrease as roads are built or abandoned, among various other examples. These changes, in some instances may be caused in part by increased and/or decreased asset activity, materials being stored and/or removed within an environment, etc. The changes in the features of the environment may be monitored by applying the model to image data captured over a period of time.

For example, after generating a first set of output data for a detected locality as described above, the asset data platform may be configured to access image data for the same locality at a later point in time and then repeat the above process to generate a second set of output data, which the asset data platform may then compare with the first set of output data to determine whether there have been any changes to the features identified in the detected locality (such as boundaries or routes) over time. For instance, based on a comparison between different sets of output data for a locality over time, the platform may be able to determine that a feature (e.g., a boundary, route, asset, etc.) has been modified, added, or removed at the locality. Additionally, based on a comparison between different sets of output data for a locality over time, the platform may be able to determine a relationship between features at the locality, such as a relationship between a static feature and a dynamic feature (e.g., that a mining truck is routed on a particular haul route) or between two dynamic features (e.g., that an excavator is loading a haul truck). In turn, the asset data platform may present a user with indication of the information determined based on this comparison, such as a notification of a change in features at the locality and/or an update to the map 900 of the detected locality.

Changes in boundaries, changes in navigation routes, and/or changes in loading and/or dump zones may provide insight in the evolution of the environment. The platform can predict where activity in the environment may be in the future so that assets can be efficiently allocated in the environment. For example, if boundaries are expanding in one direction and shrinking in another direction in an environment, then assets may be allocated to the areas where boundary is expanding as this may indicate more activity in the expanding area. As another example, if more loading and/or unloading zones are being formed in the environment, then assets may be routed closer to the loading and/or unloading zones. As yet another example, if roads are being added in an environment, then assets may be routed over these new roads to minimize travel time. As a further example, if a number of assets within a boundary or an area within a boundary exceeds a threshold amount, then assets might be reallocated. There may be too many assets within the boundary and/or area and because of the amount, usage efficiency of assets may be reduced. Without reallocation, assets may continue to travel slower due to traffic and/or wait at load sites or dump sites, for example. Other arrangements are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

What is claimed is:

1. A method carried out by a computing system that is communicatively coupled to one or more asset-related data sources, the method comprising:
   receiving asset attribute data associated with a plurality of assets, wherein the asset attribute data includes sensor data captured by sensors affixed to assets in the plurality of assets;
   based on an analysis of the received asset attribute data, detecting a grouping of related assets in a locality and thereby determining that the locality is a possible instance of a given type of real-world environment in which assets operate;
   in response to the determining, obtaining image data associated with the detected locality;
   inputting the obtained image data into a model that outputs likelihood data indicating a likelihood that any portion of the detected locality comprises a given feature of the given type of real-world environment, wherein the model was previously defined by applying a machine learning technique to training data that includes respective image data for each of a plurality of known instances of the given type of real-world environment;
   based on the likelihood data, generating output data indicating a location of any portion of the detected locality that is likely to comprise the given feature; and
   using the output data to simulate asset operation in the detected locality.

2. The method of claim 1, wherein the given type of real-world environment is one of a mining site, a construction site, a manufacturing plant, or a distribution center.

3. The method of claim 1, wherein the given feature is a one of a boundary, a navigation route, a hazard, an asset, or a structure.

4. The method of claim 1, wherein the training data further includes, for the respective image data for each of the plurality of known instances of the given type of real-world environment, label data indicating which one or more portions of the image data comprise the given feature.

5. The method of claim 4, wherein the respective image data for each of the plurality of known instances of the given type of real-world environment comprises an array of pixels, and wherein the label data comprises a plurality of labels that each correspond to a respective subset of the array of pixels.

6. The method of claim 5, wherein the model embodies a relationship between characteristics of pixels and a likelihood that pixels represent the given feature.

7. The method of claim 1, wherein the training data further includes asset attribute data associated with assets located in the known instances of the given type of real-world environment.

8. The method of claim 1, wherein the received data captured by sensors affixed to assets in the plurality of assets comprises location data captured by sensors affixed to assets in the plurality of assets.

9. The method of claim 1, wherein the obtained image data for the detected locality comprises an array of pixels, and wherein the likelihood data comprises a set of likelihood values that each correspond to a subset of the array of pixels.

10. The method of claim 1, further comprising:
    transmitting the output data to a computing device to facilitate causing the computing device to display a visualization of the output data.

11. The method of claim 1, wherein the image data for the detected locality comprises first image data, the likelihood data for the detected locality comprises first likelihood data, and the output data for the detected locality comprises first output data, the method further comprising:
    obtaining second image data associated with the detected locality, wherein the second image data is captured at a different time than first image data;
    inputting the obtained second image data into a model that outputs second likelihood data indicating a likelihood that any portion of the detected locality comprises the given feature of the given type of real-world environment, wherein the model that outputs second likelihood data is defined based on respective training data that includes respective image data for each of the plurality of known instances of the given type of real-world environment;
    based on the second likelihood data, generating the second output data indicating a location of any portion of the detected locality that is likely to comprise the given feature;
    comparing the second output data with the first output data; and
    based on the comparison, identifying a change in at least one instance of the given feature in the detected locality.

12. A computing system comprising:
    a network interface configured to facilitate communications over a communication network with one or more data sources;
    at least one processor;
    a non-transitory computer-readable medium; and
    program instructions stored on the non-transitory computer-readable medium that are executable by the at least one processor to cause the computing system to:
       receive, via the network interface, asset attribute data associated with a plurality of assets, wherein the asset attribute data includes sensor data captured by sensors affixed to assets in the plurality of assets;
       based on an analysis of the received asset attribute data, detect a grouping of related assets in a locality and thereby determine that the locality is a possible instance of a given type of real-world environment;
       in response to the determining, obtain, via the network interface, image data associated with the detected locality;
       input the obtained image data into a model that outputs likelihood data indicating a likelihood that any portion of the detected locality comprises a given feature of the given type of real-world environment, wherein the model was previously defined by applying a machine learning technique to training data that includes respective image data for each of a plurality of known instances of the given type of real-world environment;

based on the likelihood data, generate output data indicating a location of any portion of the detected locality that is likely to comprise the given feature; and use the output data to simulate asset operation in the detected locality.

13. The computing system claim 12, wherein the given type of real-world environment is one of a mining site, a construction site, a manufacturing plant, or a distribution center.

14. The computing system of claim 12, wherein the given feature is a one of a boundary, a navigation route, a hazard, an asset, or a structure.

15. The computing system of claim 12, wherein the training data further includes, for the respective image data for each of the plurality of known instances of the given type of real-world environment, label data indicating which one or more portions of the image data comprise the given feature.

16. The computing system of claim 12, wherein the model embodies a relationship between characteristics of pixels and a likelihood that pixels represent the given feature.

17. The computing system of claim 12, wherein the training data further includes asset attribute data associated with assets located in the known instances of the given type of real-world environment.

18. The computing system of claim 12, wherein the obtained image data for the detected locality comprises an array of pixels, and wherein the likelihood data comprises a set of likelihood values that each correspond to a subset of the array of pixels.

19. The computing system of claim 12, further comprising:

transmitting the output data to a computing device to facilitate causing the computing device to display a visualization of the output data.

20. A non-transitory computer-readable medium having program instructions stored thereon that are executable to cause a computing device to:

receive asset attribute data associated with a plurality of assets, wherein the asset attribute data includes sensor data captured by sensors affixed to assets in the plurality of assets;

based on an analysis of the received asset attribute data, detect a grouping of related assets in a locality and thereby determine that the locality is a possible instance of a given type of real-world environment;

in response to the determining, obtain image data associated with the detected locality;

input the obtained image data into a model that outputs likelihood data indicating a likelihood that any portion of the detected locality comprises a given feature of the given type of real-world environment, wherein the model was previously defined by applying a machine learning technique to training data that includes respective image data for each of a plurality of known instances of the given type of real-world environment;

based on the likelihood data, generate output data indicating a location of any portion of the detected locality that is likely to comprise the given feature; and use the output data to simulate asset operation in the detected locality.

\* \* \* \* \*